Figure 1:
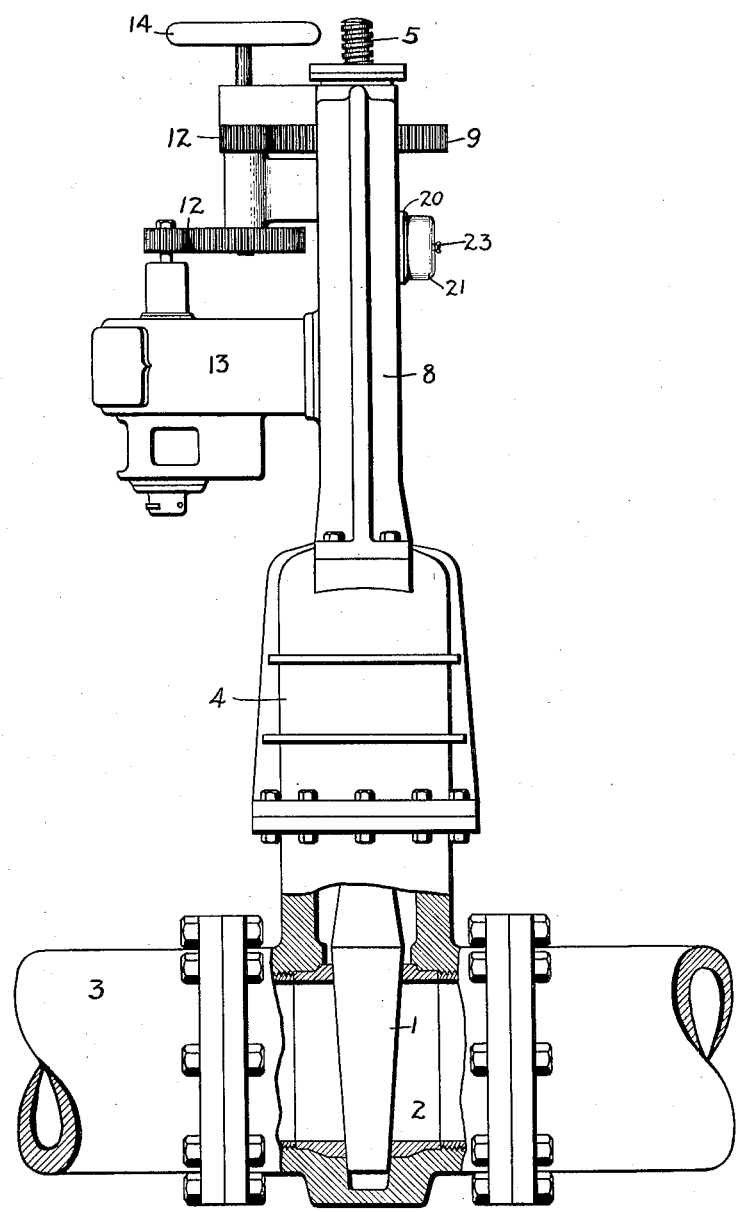

No. 835,381. PATENTED NOV. 6, 1906.
F. A. WILLARD.
MEANS FOR CONTROLLING ELECTRIC MOTORS FROM A DISTANT POINT.
APPLICATION FILED JUNE 7, 1905.
10 SHEETS—SHEET 2.

Witnesses:
Lloyd C. Bush
Helen Alford

Inventor,
Frederick A. Willard,
By Albert G. Davis
Att'y.

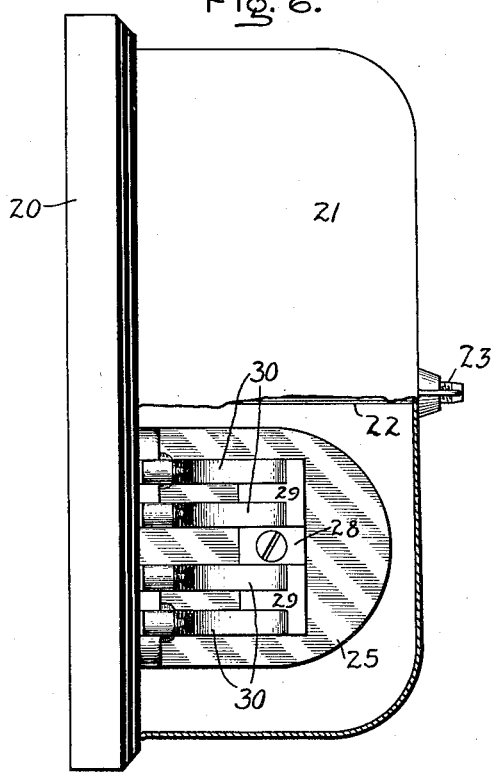
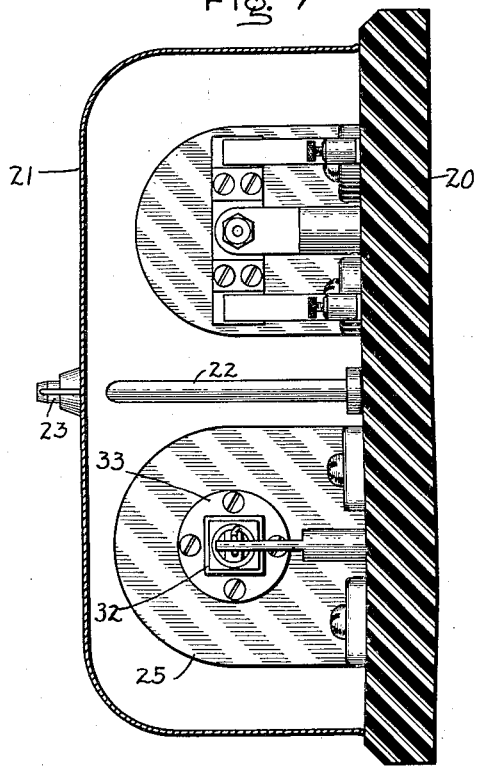
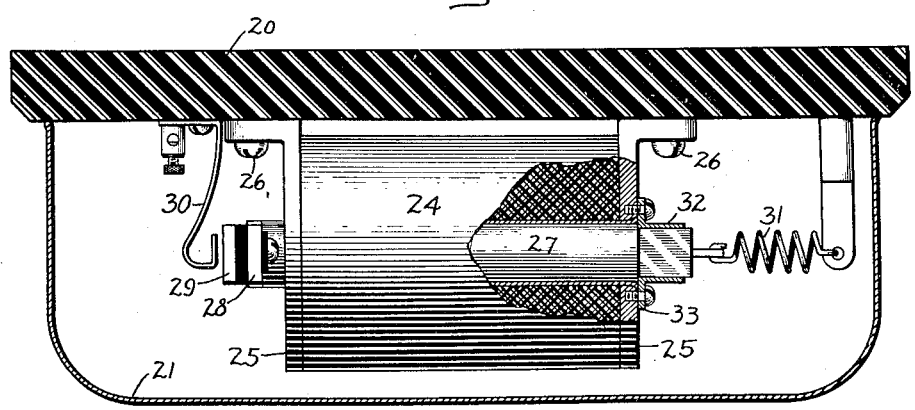

No. 835,381. PATENTED NOV. 6, 1906.
F. A. WILLARD.
MEANS FOR CONTROLLING ELECTRIC MOTORS FROM A DISTANT POINT.
APPLICATION FILED JUNE 7, 1905.

10 SHEETS—SHEET 5.

Witnesses:
Lloyd C. Bud
Arleen Alford

Inventor,
Frederick A. Willard,
By Albert S. Davis
Att'y.

No. 835,381. PATENTED NOV. 6, 1906.
F. A. WILLARD.
MEANS FOR CONTROLLING ELECTRIC MOTORS FROM A DISTANT POINT.
APPLICATION FILED JUNE 7, 1905.

10 SHEETS—SHEET 6.

Witnesses:
Lloyd C. Bush
Helen Alford

Inventor,
Frederick A. Willard,
By Albert G. Davis
Att'y.

No. 835,381. PATENTED NOV. 6, 1906.
F. A. WILLARD.
MEANS FOR CONTROLLING ELECTRIC MOTORS FROM A DISTANT POINT.
APPLICATION FILED JUNE 7, 1905.
10 SHEETS—SHEET 7.
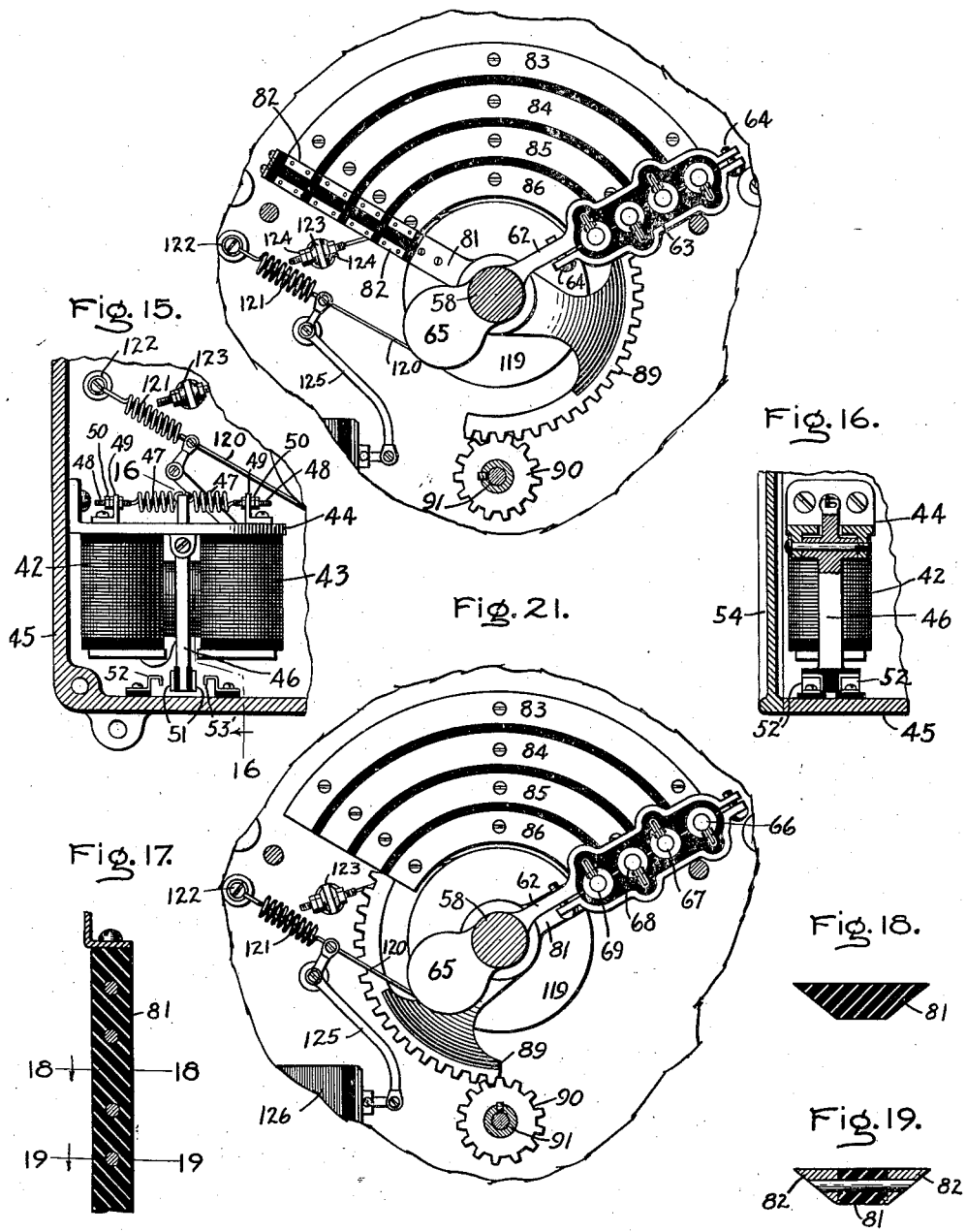
Witnesses
Lloyd C. Bush
Inventor,
Frederick A. Willard,
By Albert G. Davis
Att'y.

No. 835,381. PATENTED NOV. 6, 1906.
F. A. WILLARD.
MEANS FOR CONTROLLING ELECTRIC MOTORS FROM A DISTANT POINT.
APPLICATION FILED JUNE 7, 1905.

10 SHEETS—SHEET 8.

Witnesses
Lloyd C. Bush
Ellen Alford

Inventor,
Frederick A. Willard,
By Albert E. Davis
Att'y

No. 835,381. PATENTED NOV. 6, 1906.
F. A. WILLARD.
MEANS FOR CONTROLLING ELECTRIC MOTORS FROM A DISTANT POINT.
APPLICATION FILED JUNE 7, 1905.
10 SHEETS—SHEET 9.
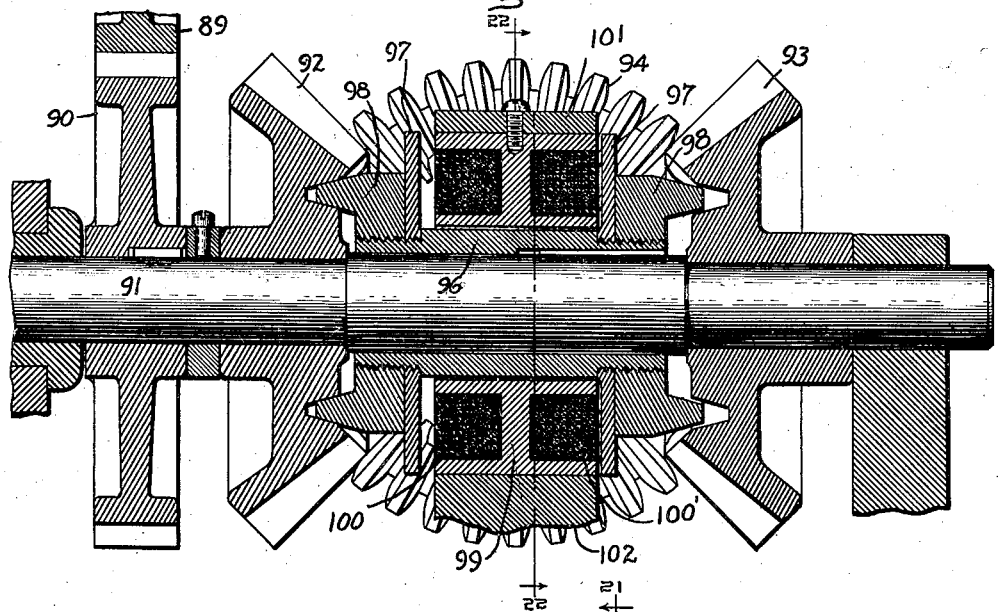
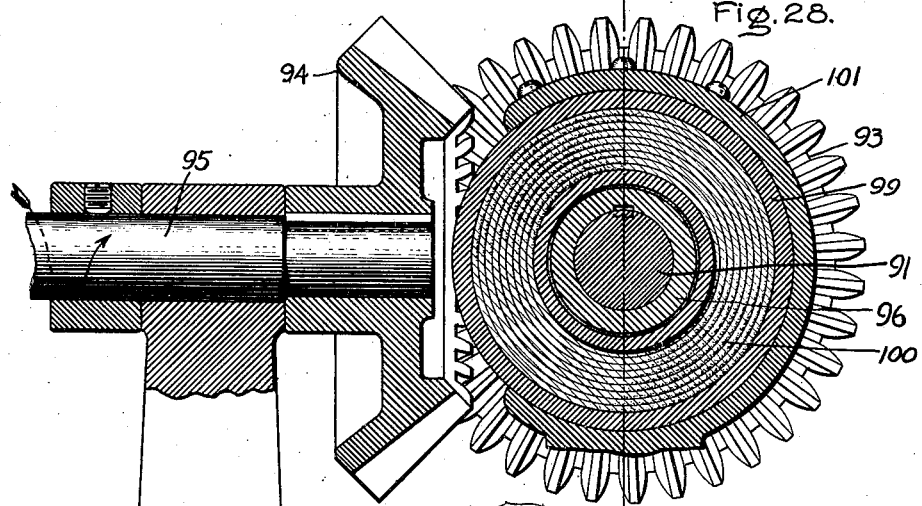
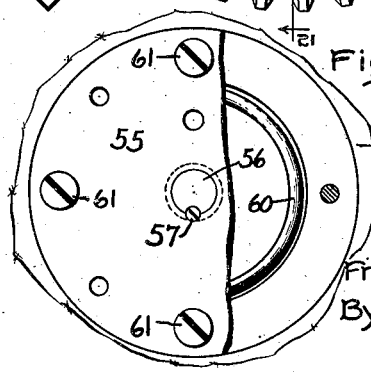
Witnesses:
Lloyd C. Bush
Helen Alford
Inventor,
Frederick A. Willard,
By Albert G. Davis
Att'y

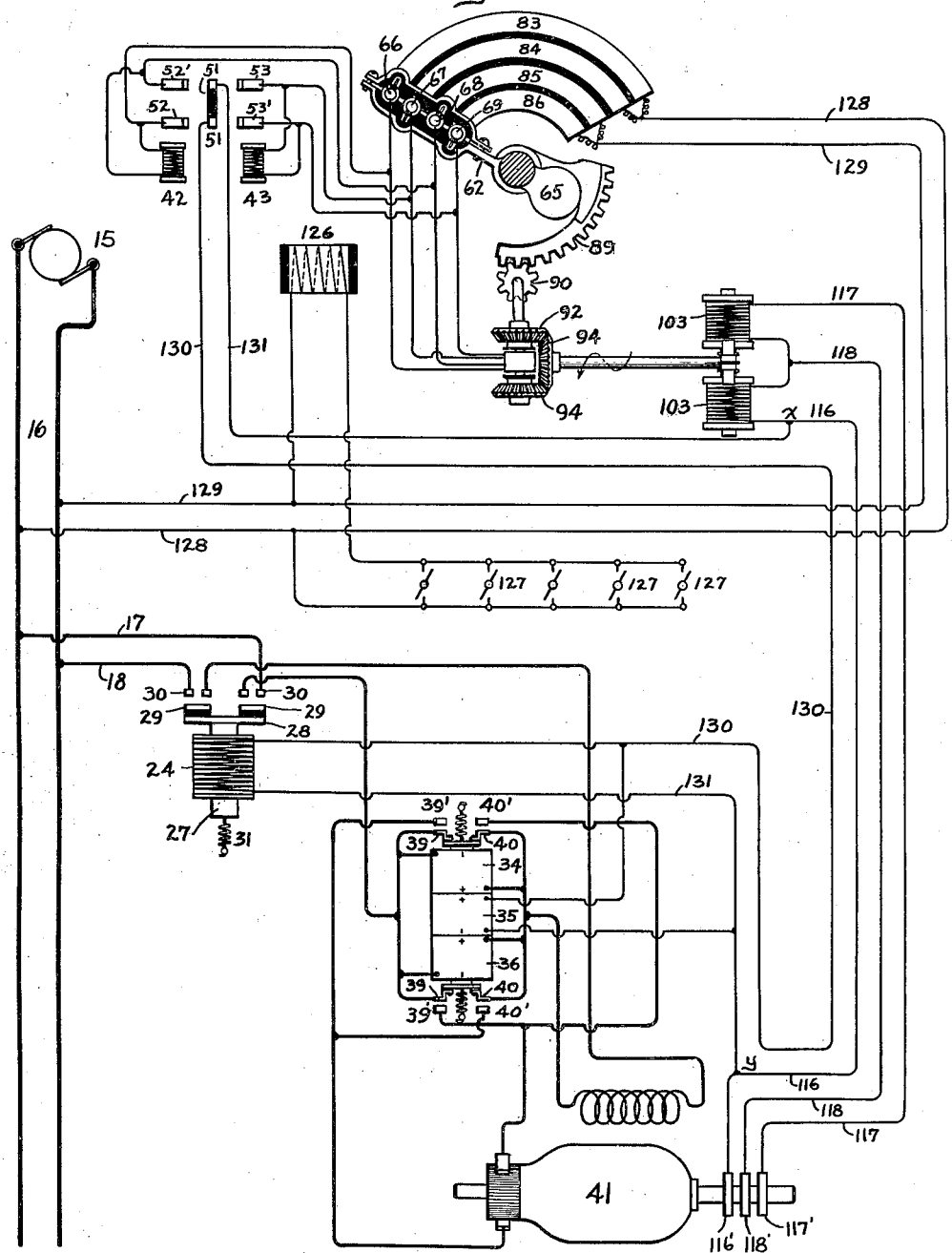

UNITED STATES PATENT OFFICE.

FREDERICK A. WILLARD, OF LYNN, MASSACHUSETTS, ASSIGNOR TO GENERAL ELECTRIC COMPANY, A CORPORATION OF NEW YORK.

MEANS FOR CONTROLLING ELECTRIC MOTORS FROM A DISTANT POINT.

No. 835,381.  Specification of Letters Patent.  Patented Nov. 6, 1906.

Application filed June 7, 1905. Serial No. 264,077.

*To all whom it may concern:*

Be it known that I, FREDERICK A. WILLARD, a citizen of the United States, residing at Lynn, county of Essex, State of Massachusetts, have invented certain new and useful Improvements in Means for Controlling Electric Motors from a Distant Point, of which the following is a specification.

This invention relates to mechanism and electric circuits whereby an electric motor located at some distance from a controlling-station can be caused to move a given device back and forth within a predetermined range of travel in varying amounts and in either direction from any point within said range. Such a device is useful in operating valves, signals, turrets, and other mechanism which is capable of reciprocation within specified limits. It finds especial usefulness in handling the valves which control large steam-pipes or water-mains. When the diameter of such conduits is four or five feet or more, the valves are too heavy to be easily moved by hand, and since in addition to the provision of a motor it is frequently desirable to operate a number of valves from a central station a system of electrical control is highly desirable, because of its flexibility and economy.

When the invention is applied to a valve, the screw-threaded spindle thereof is geared to the shaft of a reversible electric motor. The switch which controls the motor shows by its position with reference to a graduated scale the amount of opening which it is desired to impart to the valve. An "answer-back" indicator traveling over the same scale shows the actual movement of the valve. When the two coincide, the motor is automatically stopped. A further movement of the switch in either direction causes a corresponding movement of the valve, the indicator chasing up the switch-arm until it overtakes it again. One or more emergency-switches enables the switch-arm to be thrown to the "shut" position by a spring whenever it is wished to close the valve from some other point than the control-station. This enables a steam-main, for instance, to be shut off from several points in a factory in case of accident. An instance of a device of this general character is found in the application of L. A. Tirrill, Serial No. 223,706. In the Tirrill construction, however, the valve changes its position by a certain definite fraction of its total range. It is frequently desirable to adjust the valve to positions between those corresponding with such regular equal graduations, and I have aimed to provide in my present invention for accomplishing this result. In the details of construction and the system of electrical circuits also I have departed widely from the Tirrill device.

Figure 2:
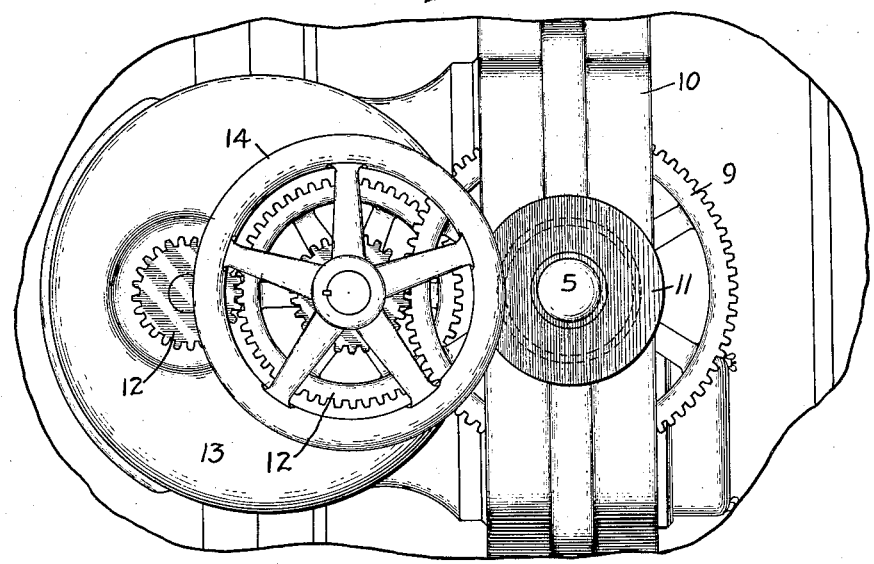
Figure 3:
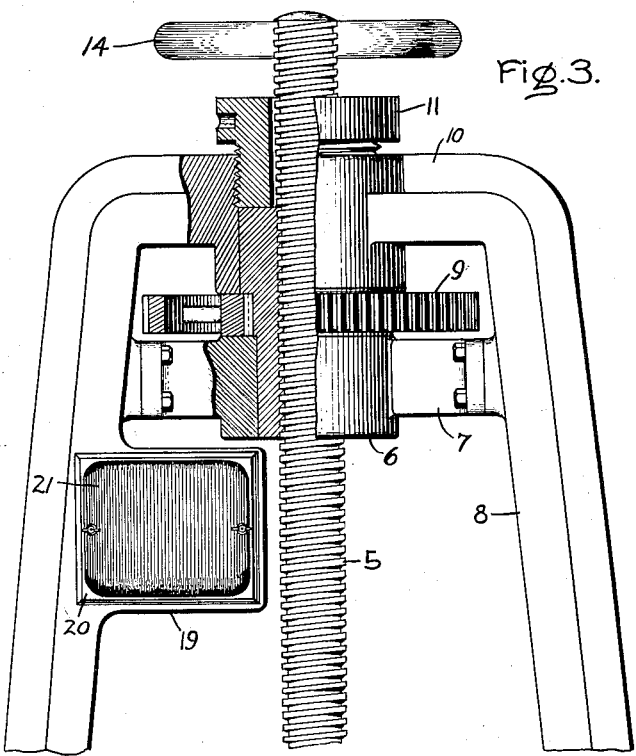
Figure 4:
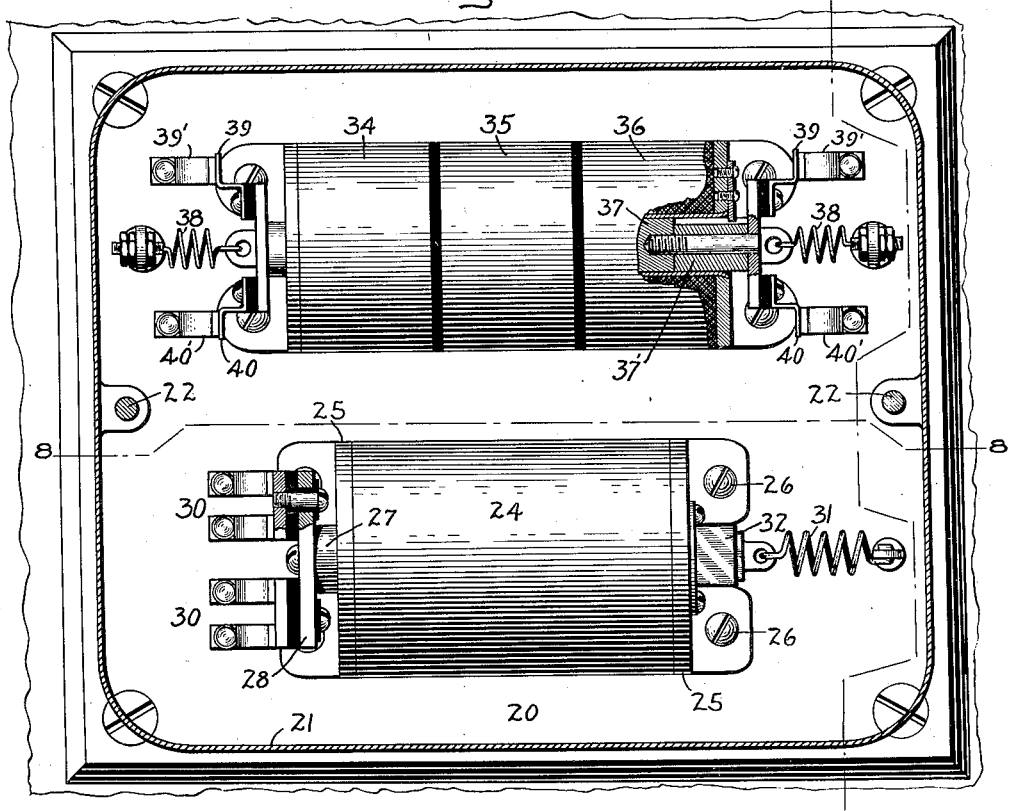
Figure 5:
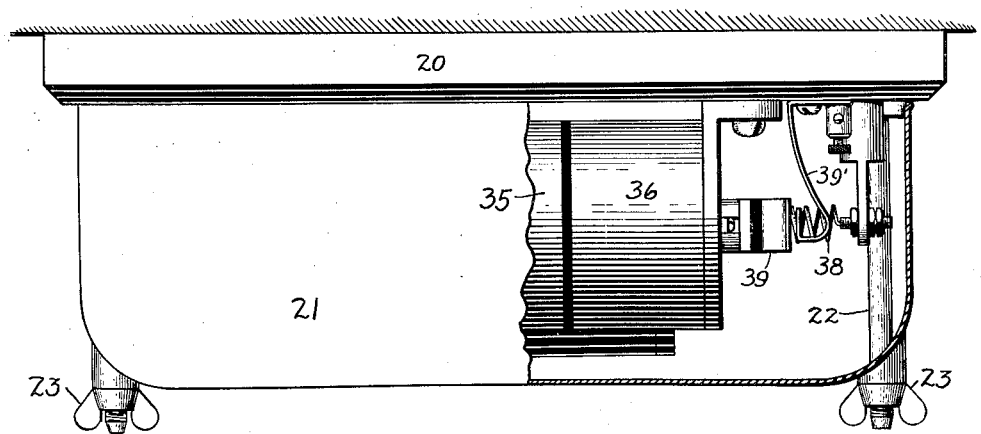
Figure 9:
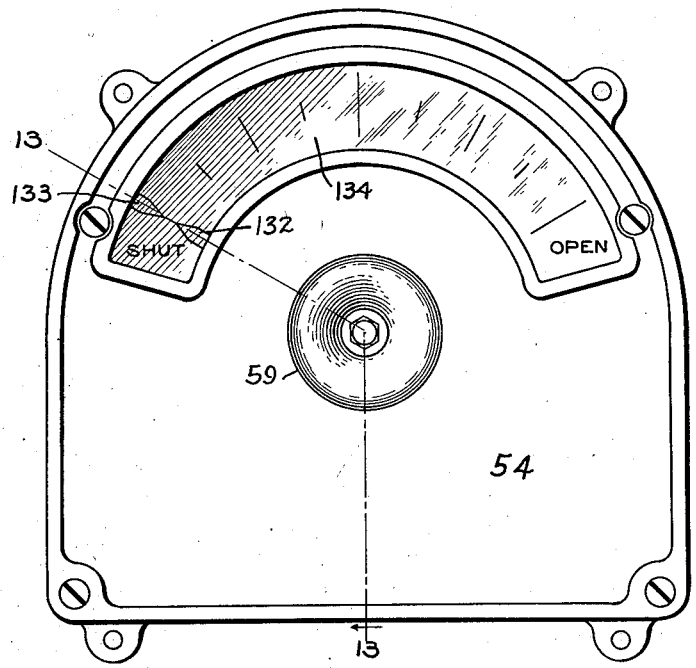
Figure 10:
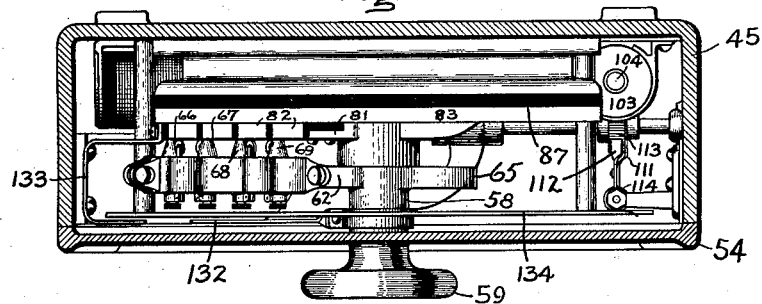
Figure 11:
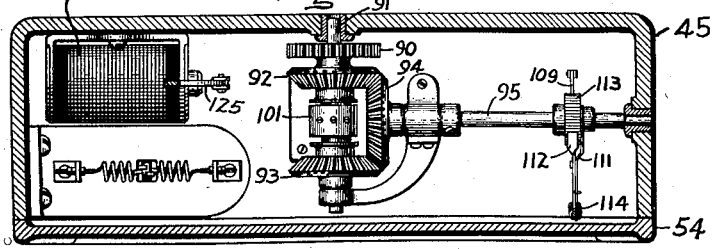
Figure 12:
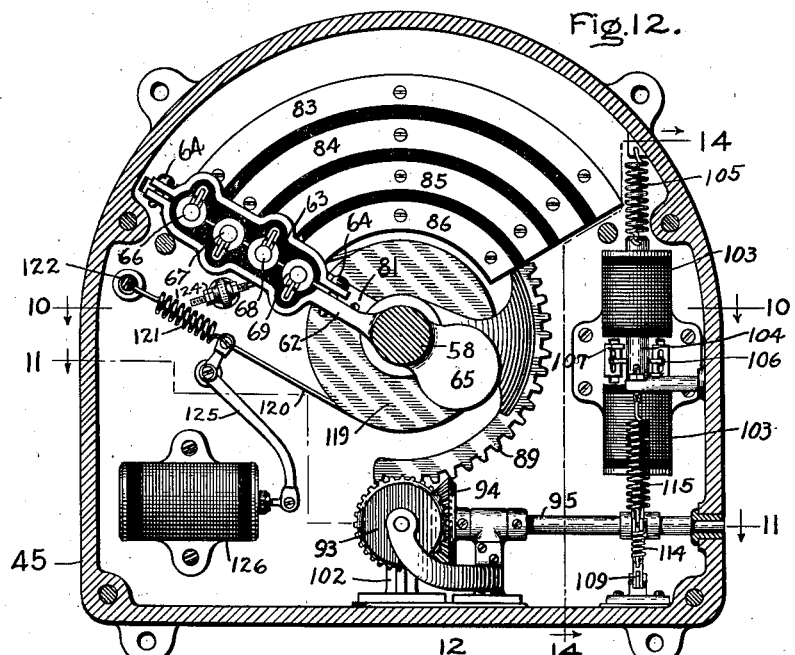
Figure 14:
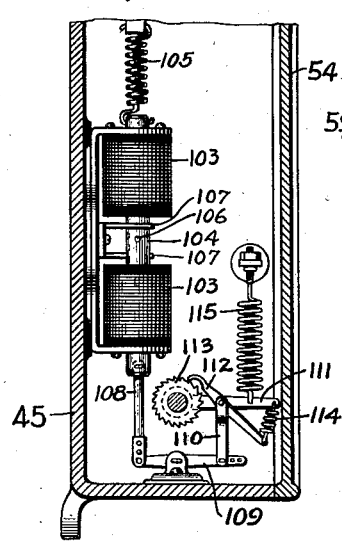
Figure 13:
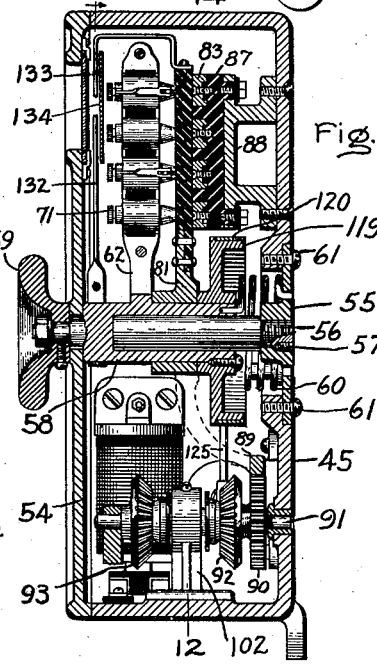
Figure 22:
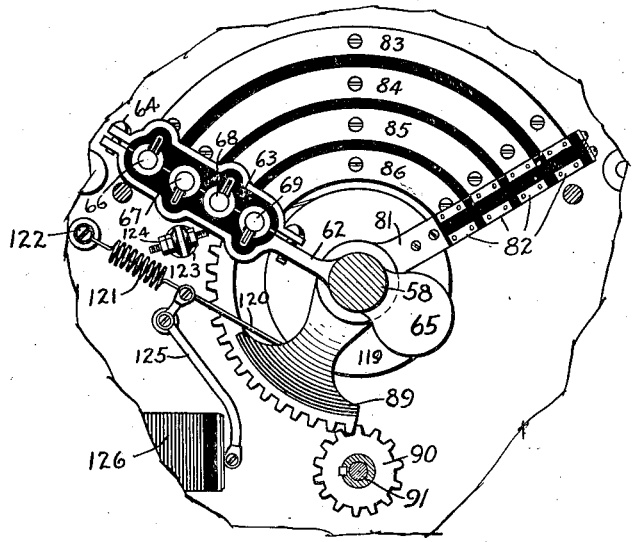
Figure 23:
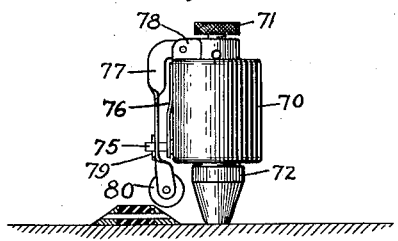
Figure 24:
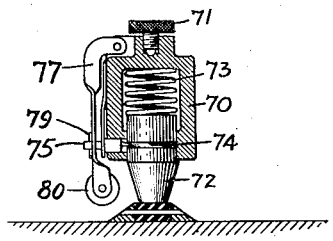
Figure 25:
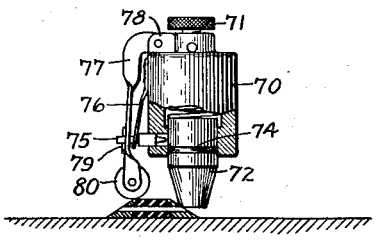
Figure 26:
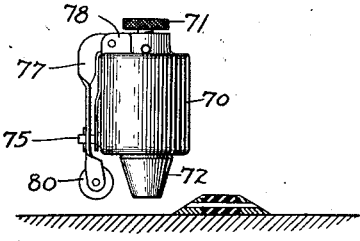

In the accompanying drawings, which represent the application of my invention to a sliding-gate valve, Figure 1 is a side elevation of a motor-driven valve with a reversing device mounted thereon. The lower portion of the valve is broken away, showing the tapered sliding gate in a closed position. Fig. 2 is a plan view of the same. Fig. 3 is a side elevation of the valve-yoke, partially broken away, and also illustrates the position of the reversing and switch box secured to said yoke. Fig. 4 is an elevation, with cover broken away, illustrating the construction of the reversing and main-line switches. Fig. 5 is a plan view of the same, with cover partially broken away, illustrating the reversing-switch. Fig. 6 is a side elevation of the same, illustrating the line-switch. Fig. 7 is a section on the line 7 7, Fig. 4. Fig. 8 is a section on the line 8 8, Fig. 4, illustrating the main-line switch. Fig. 9 is an elevation of the controller-box. Fig. 10 is a plan of the same, with the casing broken away, taken on the line 10 10, Fig. 12. Fig. 11 is a section taken on the line 11 11, Fig. 12. Fig. 12 is a section on the line 12 12, Fig. 13, back of the pole-changer device. Fig. 13 is a section taken on the line 13 13, Fig. 9. Fig. 14 is a section on the line 14 14, Fig. 12. Fig. 15 is a fragmentary view showing the pole-changer device. Fig. 16 is a section of the same on the line 16 16, Fig. 15. Fig. 17 is a detail view of the answering switch-arm. Fig. 18 is a section taken on the line 18 18, Fig. 17. Fig. 19 is a section on the line 19 19, Fig. 17. Fig. 20 is an elevation, showing the open position of the switch-arm just before the answering switch-arm has begun to move. Fig. 21 shows both switch-arms in the wide-open position of the valve. Fig. 22 illustrates the position of the manually-operated switch-arm immediately after the emergency-brake has been operated. Figs. 23–26, inclusive, illustrate the construction and motion of a contact-plug. Figs. 27-28 illustrate the mechanism for obtaining a reverse motion, these being located in the controller-box. Fig. 29 is a detail view showing the adjusting-cover located on the back of the controller-box, and Fig. 30 is a diagram of connections.

The valve shown is of the sliding-gate type. The gate 1 is preferably double-faced and is made wedge-shaped or tapering in order to coöperate with a taper seat 2, which is an exact counterpart of the gate, to insure a tight closure. The motion of the gate is transverse to the flow of steam or other fluid through the main or conduit 3. The spindle of the valve passes through a bonnet 4, which receives the gate when it is raised to open it. The upper portion of the spindle 5 is screw-threaded and meshes with a nut 6, rotatable in a cylindrical bearing in a bridge 7, supported on a yoke 8, surmounting the bonnet 4. A gear-wheel is keyed on the nut with its hub resting on the bridge, which thus sustains the downward thrust on the nut when the gate is being opened. Above the gear-wheel the nut has a rotating fit in the upper end or cross-pieces 10 of the yoke, into which is screwed a gland 11, concentric with the spindle 5 and abutting on the upper end of the nut to resist the upward thrust when the gate is being closed. The gear-wheel 9 is connected by a train of gears and pinions 12 with the armature-shaft of a series-wound direct-current electric motor 13, whose frame is secured to the yoke 8. A hand-wheel 14 enables the valve to be operated by hand when desired.

A direct-current generator 15 is connected by mains 16 and branch leads 17 18 with the motor through a main-line switch and a reversing-switch. In the diagram Fig. 30 the mains and the motor-leads are shown by heavy black lines, the control-circuits being shown by light lines.

The main-line switch and the reversing-switch are located near the motor, being conveniently housed in a box secured to a bracket 19 on the yoke 8. The box comprises a slate panel 20 and an inclosing sheet-metal cover 21, which is secured in position by studs 22 and wing-nuts 23.

The main-line switch comprises a solenoid 24, provided with end supporting-plates 25, which are secured to the panel 20 by screws 26. The axially-movable core 27 carries at one end a transverse bar 28, having attached thereto suitable contact-strips 29, insulated from said bar and each adapted to bridge a pair of contacts 30, forming the terminals of gaps in the motor-leads 17 18. A spring 31 retracts the core and opens both leads when the solenoid is deënergized. Suitable means are provided for preventing the core from rotating, in order to maintain the bar and its contacts in the proper position. The preferred device is a polygonal tube 32, fitting a polygonal portion of the core and having a flange 33 secured to one of the end supporting-plates 25. A shoulder on the core abuts against said flange when the core is retracted, so as to limit the backward movement of said core. The reversing-switch also is mounted on the panel 20 and comprises a solenoid built up of three suitably-insulated coils 34 35 36, having a common core 37, which is held in a normally central position by springs 38. In order to shorten the magnetic portion of the core and render its action more prompt, its end portions 37' are made of brass or any suitable non-magnetic material. The two end coils 34 36 are connected in multiple across the motor-leads and in such a manner that they have constant polarity, but are in opposition to each other. The center coil 35 is connected with the controlling-station and may be reversed in polarity, so as to assist one end coil and oppose the other at will. When the center coil is energized, the core is moved lengthwise in one direction or the other, causing the insulated contacts 39 40 on its ends to close respectively on the contacts 39' 40', or vice versa, and thereby send current through the motor-armature 41 in one direction or the other. The contacts 39 are permanently connected with the branch lead 17 and the contacts 40 with the lead 18, while the contacts 39' are connected with one armature-brush of the motor and the contacts 40' with the other brush.

Inasmuch as the movement of the reversing-switch depends upon the polarity given to the central coil 35 of the solenoid, there must be provided a second reversing-switch or pole-changer controlling the connections of this coil with a source of current. The construction of this pole-changer is shown in Figs. 15 and 16. Two electromagnets 42 43 are secured to a bracket 44, projecting from the inside of a casing 45, which incloses the mechanism at the controlling-station. An armature 46 is provided between the magnets and is retained normally in a central position by opposed springs 47, each attached at one end to the armature and at the other end to screw-threaded stems 48, passing through studs 49 and provided with nuts 50 for adjusting the tension of said springs. The armature carries two insulated contacts 51, which form the terminals of the coil 35 in the motor-reversing switch. The solenoid 24 of the main-line switch is connected in multiple with the coil 35, so that both coils will be energized simultaneously. On each side of the armature 46 stands a pair of stationary contacts 52 52' 53 53'. The electromagnet 42 is connected across the contacts 52 52' and the electromagnet 43 across the contacts 53 53'. These contacts and magnets can be placed in circuit with the mains 16 by means of a movable carrier, preferably a pivoted switch-arm, which carries four separate insulated contact-plugs, respectively connected with the contacts 52 52' 53 53'. The plugs coöperate with stationary contact-strips parallel with the movement of the carrier—that is, concentric with the axis when the switch-arm is pivoted—the construction being such that when the arm is moved in one direction the contacts 52 52' and the electromagnet 42 are energized, while a reverse movement of the switch-arm kills these and energizes the other contacts 53 53' and the magnet 43. The construction of this switch constitutes one of the novel features of my invention and will now be described in detail. It forms part of the controlling mechanism and is located at the controlling-station. The working parts are inclosed in the casing 45, which has a removable front 54. In the back of the casing is a circular hole, closed by a circular cover 55, preferably provided with a central hub to which is fastened an inwardly-projecting arbor or trunnion 56. If the arbor is screwed into a socket in the hub, it is then locked against rotation by means of a screw 57. Rotatably mounted on the arbor is a sleeve 58, which has a reduced portion extending through the front of the casing and provided with a handle 59. A spring 60 is anchored in the rear end of the sleeve and the circular cover 55 and constantly urges the sleeve toward an initial position. In order to adjust the spring, the screws 61, holding the cover in place, are removed and the cover rotated until the screw-holes register again. In this way the tension of the spring can be changed as desired.

The sleeve 58 carries a switch-arm 62, which is split lengthwise and recessed to receive the split insulation 63, retained in position by the screws 64 and holding the four contact-plugs hereinafter described. The switch-arm is balanced by a counterweight 65 on the opposite side of the sleeve. Each of the four contact-plugs 66 67 68 69 has a tubular body 70, provided with a binding-screw 71, to hold the terminal of a flexible conductor in circuit with one of the contacts 52 52' 53 53'. Slidably mounted in the body is a plunger or contact member 72, which is urged outwardly by a spring 73. A circumferential groove 74 is cut in the plunger to receive the inner end of a locking-bolt 75, which can slide radially in a hole in the body 70. A leaf-spring 76 is secured to the body and engages with the outer end of the bolt to press it inwardly. This outer end of the bolt also passes through a lever 77, pivoted in lugs 78 on the body. A pin 79 in the outer end of the bolt 75 enables the lever to move the bolt outwardly and release the plunger when the lever is swung away from the body 70. The free end of the lever is preferably provided with an antifriction-roller 80. The plugs 66 68 have the levers on one side of the switch-arm and the plugs 67 69 on the other side thereof.

Loosely pivoted on the sleeve 58, so as to move concentric therewith, is an arm 81, termed the "answer-back" arm. This is made of insulation with metallic beveled edges 82 and is adapted to engage the outer ends of the plungers 72 and force them into the bodies 70 until they rest on the insulated middle portion of the arm, in which position they will be locked by the bolts 75.

Rigidly secured to the back of the casing 45 are four parallel contact-segments 83 84 85 86, preferably concentric with the arbor 56 and mounted on a block of insulation 87, which is secured to a pedestal 88, attached to the back of the casing. These segments are respectively in line with the four contact-plugs, and when the main switch-arm is moved away from a position directly in front of the answer-back arm the two plugs whose levers are on that side will be unlocked and will make contact with their respective segments. The unlocking is caused by the rollers 80 striking the answer-back arm and swinging out away from the bodies 70, thereby withdrawing the bolts from the plungers.

The segments 83 84 are electrically connected with one of the mains 16 and the segments 85 86 with the other main. If, therefore, in the construction shown in Figs. 12 and 30 the main switch-arm is moved to the right, the plugs 67 69 will make contact with the strips 84 86, the pole-changer magnet 43 will be energized, the reversing-switch will close, and the motor will start in a direction to open the valve 1. The motor will run until the plugs are lifted from the segments to open the circuit of the pole-changer magnet, and thereby deënergize the reversing-switch. This is effected by the answer-back arm, and the mechanism whereby it is caused to follow up the main switch-arm will now be described.

The answer-back arm has a segment-gear 89, located, preferably, on the opposite side of the sleeve 58 and meshing with a gear wheel or pinion 90, keyed on a shaft 91, journaled in suitable bearings inside the casing 45. Means are provided for driving said shaft in opposite directions, comprising, preferably, two oppositely-arranged bevel-gears 92 93, loose on the shaft and meshing with a driving bevel-gear 94, keyed on a driving-shaft 95 at right angles with the shaft 91. Between the gears 92 93 the shaft 91 is preferably somewhat enlarged to receive a sleeve 96, splined on said shaft. The ends of the sleeve are provided with disks 97, preferably mounted on reduced portions of the hub, which carry also clutch members 98, adapted to engage with corresponding clutch members on the gears 92 93.

Surrounding the sleeve, but not in contact therewith, is a double-faced annular electromagnet, comprising a frame 99 and two coils 100 100′. The magnet is held stationary in a circular frame 101 on the upper end of a post 102. The two faces of the magnet face the disks 97, which serve as armatures therefor. When one coil is energized, the sleeve is slid one way and clutches the gear at that end to the shaft. When the other coil is energized, the other gear is clutched. As the gears are driven in opposite directions by the driving-gear 94 the shaft 91 will be rotated one way or the other, depending upon which coil is energized.

Suitable means are provided for rotating the shaft 95 in the direction of the arrows in Figs. 28 and 30. Said means are under the control of the motor, so that said shaft will rotate simultaneously with the operation of said motor and at no other time. I prefer to use for this purpose a reciprocating alternating-current motor receiving current from the armature-winding of the motor 41. The preferred form of motor comprises two solenoids 103, arranged vertically in tandem and having a common core 104, suspended by a spring 105, so that the solenoids do not have to lift its weight. The travel of the core is limited by a pin 106 projecting therefrom and playing between fixed stops 107. A link 108 connects the lower end of the core with a rocker 109, pivoted in a bearing on the casing. The point of connection of the link and the rocker can be adjusted, as indicated in Fig. 14. The other end of the rocker is connected by a link 110 with a lever 111, pivoted on the shaft 95 and carrying a pivoted pawl 112, engaging with a ratchet-wheel 113 on said shaft. The link 110 can be adjustably connected with the rocker to vary the throw of the lever. A spring 114 connects the pawl and the lever, and a spring 115 sustains the weight of said lever.

The solenoids 103 are connected in series between two leads 116 117, running to collector-rings 116′ 117′ on the shaft of the motor-armature 41. A third ring 118′ is connected by a lead 118 to a point between the two solenoids. The rings are connected to three points ninety degrees apart in the motor-armature winding, which is of the Gramme ring type. The two-phase alternating current taken off by these rings causes the solenoids 103 to be alternately energized, thereby imparting a reciprocating motion to the core 104.

The tension-spring 60 has been previously mentioned and its object stated to be the return of the main switch-arm to its initial position when desired. This operation of the spring is normally prevented by a friction-brake acting on the sleeve 58 with sufficient pressure to resist the tension of the spring and hold the arm at any position to which it may be moved. I prefer the brake shown, which comprises a drum 119, secured on the sleeve 58, and a band-brake 120, partially encircling said drum. One end of the band is attached to a spring 121, anchored to a stud 122 in the back of the casing 45. The other end of the band is provided with a screw-threaded portion passing through an eye in a stud 123 and equipped with nuts 124, by means of which the tension of the spring and the resulting pressure of the band on the drum can be adjusted. A lever 125 has one end attached to the band near the spring and its other end pivotally connected with the core of a solenoid 126, connected across the leads 16. Push-buttons 127 control the circuit of this solenoid. In case of an emergency the closing of this circuit causes the solenoid to exert a pull on the band, which slackens its hold on the drum sufficient to permit the tension-spring 60 to return the switch-arm to the shut position.

Referring now to the diagram Fig. 30, it will be seen that current is led from one of the mains 16 to the segments 83 84 by a lead 128 and from the other main 16 to the segments 85 86 by a lead 129. The plug 66 is connected with the contact 52, the plug 67 with the contact 53, the plug 68 with the contact 52′, and the plug 69 with the contact 53′. The pole-changer magnet 42 and the annular clutch-magnet coil 100 are connected across the plugs 66 68 and the magnet 43 and the coil 100′ across the plugs 67 69. It will be remembered that when the switch-arm 62 is moved to the right the plug 67 takes current from the segment 84, the return-circuit being through the plug 69 and the segment 86. When the arm is moved to the left, the plug 66 takes current from the segment 83 and the plug 68 returns it through the segment 85.

The contacts 51 of the pole-changer are connected with the coil 24 of the main-line switch and the control-coil 35 of the motor-reversing switch by the leads 130 131. In order to save wire in the cable connecting the controlling-station with the motor, one of the alternating-current leads, as 116, may be substituted for a portion of the lead 131, as from the point $x$ to the point $y$ in Fig. 30.

The operation of the invention is as follows: Suppose the parts to stand in the position shown in Figs. 9, 10, 12, and 30, with the switch-arm and the answer-back arm both at the left-hand side of the casing, a pointer 132, secured on the sleeve 58 in line with the said arm, registering with the pointer 133 on the answer-back arm, and both located near the word "Shut" on a graduated dial 134, which is visible through a curved glazed opening in the casing 45. In this position the plungers all rest on the insulating middle portion of the arm 81. The levers 77 on the plugs 66 68 are on the upper side of the arm 81, while the lever 77 on the other two plugs are on the lower side thereof. Now let the switch-arm 62 be moved to the right to a point on the dial representing the amount which it is desired to open the valve 1—for instance, to the "full-open" position, as shown in Fig. 20. The trailing-levers 77 on the plugs 67 and 69 will be pulled out by passing up the beveled edge of the arm 81, releasing the plungers 72 in those plugs, and allowing them to be forced by their springs 73 against the segments 84 86. This energizes the pole-changer magnet 43 and the clutch-magnet 100'. The pole-changer contacts 51 close on the contacts 53 53', so that they are put in circuit with the plugs 67 69. This energizes the main-line switch 24 and the center coil 35 of the reversing-switch, causing both switches to close. The motor starts in the proper direction to open the valve 1. As soon as the armature 41 begins to rotate it generates an alternating current, which flows through the solenoids 103, and thereby drives the shaft 91 clockwise in Fig. 14. Since the clutch-coil 100' has caused the sleeve 96 to slide to the left in Fig. 27, the gear 92 will be clutched to the shaft 91, which will at once begin to turn the pinion 90 and the segment-gear 89 in the proper direction to cause the answer-back arm 81 to chase after the main switch-arm 62. As soon as the answer-back arm reaches the switch-arm and passes under it, as shown in Fig. 21, it lifts the plugs 67 69 off the segments 84 86 and breaks the control-circuit. The pole-changer armature returns to its central position, separating the contacts 51 from the contacts 53 53'. The clutch-magnet releases the gear-wheel 92, so that the answer-back arm stops moving, the motor-switches open, the motor stops, and the valve 1 is full open. It will be seen that as the motor is geared to the valve-spindle the motor must make a predetermined number of revolutions to fully open the valve. At each revolution there is a reversal of movement in the alternating-current mains, so that the ratchet-wheel 113 is given a definite number of actuations during the opening of the valve. The gearing is so designed that these actuations will be just sufficient to move the answer-back arm into coincidence with the switch-arm. The same holds good for any intermediate position of the switch-arm, so that it can be placed at any point desired within the range of its travel, and the valve 1 will be opened a corresponding distance, the answer-back arm following it whichever way it may be moved and stopping when both arms register. At any time during the operation of the motor or after the valve has been opened the brake can be released by closing the circuit of the emergency-solenoid, when the switch-arm will fly back to the shut position, as shown in Fig. 22. This will instantly reverse the motor and start it to close the valve and return the answer-back arm to the shut position.

What I claim as new, and desire to secure by Letters Patent of the United States, is—

1. Means for operating a reciprocating device from a distant station, comprising a reversible electric motor geared to said device, an electrically-actuated reversing-switch, a pole-changer at said station in circuit with said reversing-switch, two electromagnets for actuating said pole-changer, and a switch-arm provided with means for energizing one or the other of said magnets according to the direction in which said arm is moved.

2. Means for operating a reciprocating device from a distant station, comprising a reversible electric motor geared to said device, a reversing-switch comprising two opposed solenoids and a central solenoid, means for energizing the opposing solenoids, and means at said station for sending current in either direction through said central solenoid.

3. The combination with a reversible electric motor, of a reversing-switch comprising a solenoid having two end coils and a central coil, a core common to all and carrying contacts, leads connected with said end coils so as to energize them in opposition, and a pole-changer at a distant station controlling the polarity of the central coil.

4. The combination with a reversible electric motor, of a reversing-switch comprising a solenoid having two end coils and a central coil, a core common to all, insulated contacts on each end of said core, fixed contacts coöperating therewith and forming terminals for the motor-armature, leads connected with the contacts on the core and with the end coils, and a pole-changer at a distant station controlling the polarity of the central coil.

5. The combination with a reversible electric motor, of a reversing-switch comprising a solenoid having two end coils and a central coil, a core common to all and carrying contacts controlling the motor-armature, leads connected with said end coils so as to give them opposite polarity, an electromagnetic switch for said leads, and a pole-changer at a distant station controlling said switch and also the polarity of the central coil of the solenoid.

6. A reversing-switch comprising a solenoid having three coils, the end coils being connected to give opposite polarity, a movable core having a middle portion of magnetic material and end portions of non-magnetic material, and insulated contacts carried on said end portions.

7. Means for operating a reciprocating device from a distant station, comprising a reversible direct-current electric motor geared to said device, an electric reversing-switch controlling said motor, a pole-changer at said station controlling said switch, a manually-operated switch-arm controlling said pole-changer, an answer-back arm coöperating with said switch-arm, and means connected with the motor for actuating said answer-back arm.

8. Means for operating a reciprocating device from a distant station, comprising a reversible direct-current electric motor geared to said device, an electric reversing-switch controlling said motor, a pole-changer at said station controlling said switch, a manually-operated switch-arm controlling said pole-changer, an answer-back arm coöperating with said switch-arm, and an alternating-current motor for actuating said answer-back arm.

9. Means for operating a reciprocating device from a distant station, comprising a reversible direct-current electric motor geared to said device, an electric reversing-switch controlling said motor, a pole-changer at said station controlling said switch, a manually-operated switch-arm controlling said pole-changer, an answer-back arm coöperating with said switch-arm, and an alternating-current motor for actuating said answer-back arm, said alternating-current motor operating in synchronism with the direct-current motor.

10. Means for operating a reciprocating device from a distant station, comprising a reversible direct-current electric motor geared to said device, an electric reversing-switch controlling said motor, a pole-changer at said station controlling said switch, a manually-operated switch-arm controlling said pole-changer, an answer-back arm coöperating with said switch-arm, and an alternating-current motor for actuating said answer-back arm, said alternating-current motor comprising coils connected with points on the armature-winding of the direct-current motor.

11. In a device for controlling an electric motor from a distant station, the combination with parallel contact-segments, of a carrier movable over the same, contact-plugs on said carrier adapted to close on said segments, and a movable bar adapted to disengage said plugs from said segments.

12. In a device for controlling an electric motor from a distant station, the combination with concentric contact-segments, of a switch-arm pivoted concentrically therewith, contact-plugs on said arm adapted to close respectively on said segments, and an arm pivoted concentrically with said switch-arm, and having a beveled edge to pass under said plugs and lift them from the segments.

13. In a device for controlling an electric motor from a distant station, the combination with concentric contact-segments, of a switch-arm pivoted concentrically therewith, contact-plugs on said arm, and an arm pivoted concentrically with said switch-arm and having an insulated middle portion provided with metallic beveled edges to lift said plugs from said segments.

14. In a device for controlling an electric motor from a distant station, the combination with concentric contact-segments, of a switch-arm, a piece of insulation split lengthwise and clamped to said arm, and contact-plugs held between the two parts of said insulation.

15. The combination with a switch-arm, of a contact-plug comprising a tubular body, a spring-actuated plunger therein, a locking device for retaining said plunger out of action, and means for unlocking said plunger when said arm is moved.

16. The combination with a switch-arm, of a contact-plug comprising a tubular body, a spring-actuated plunger therein, a spring-bolt for locking said plunger, a lever for withdrawing said bolt, and means for actuating said lever when the arm is moved.

17. The combination with a switch-arm of two or more contact-plugs each having a movable plunger, means for locking said plungers, and means for unlocking one or more when the arm is moved in one direction and the remainder when the arm is moved in the opposite direction.

18. The combination with a switch-arm, of two or more contact-plugs each having a movable plunger, a lock for each plunger comprising a lever, the levers being located respectively on opposite sides of said plugs, and a bar interposed between said levers.

19. The combination with concentric contact-segments, of a switch-arm, two or more contact-plugs on said arm each having a spring-actuated plunger, a lock for each plunger comprising a lever, said levers being located respectively on opposite sides of said arm, and a second arm pivoted concentrically with the switch-arm and having an insulated portion to lift said plugs out of contact with said segment when the two arms register, said second arm lying between the levers so as to trip those on one side when the switch-arm is moved toward the opposite side.

20. The combination with concentric contact-segments, of a switch-arm, two or more contact-plugs on said arm each having a spring-actuated plunger, a lock for each plunger comprising a lever, said levers being located respectively on opposite sides of said arm, and a second arm pivoted concentrically with the switch-arm and having an insulated portion to lift said plugs out of contact with said segments when the two arms register, said second arm lying between the levers so as to trip those on one side when the switch-arm is moved toward the opposite side, and means for causing said second arm to follow up the switch-arm after the latter has been moved, until the arms again register.

21. In a device for controlling an electric motor from a distant station, a switch-arm for starting said motor, an answer-back arm for following up the switch-arm, a driving-shaft rotated always in the same direction so long as said motor is running, and means for causing said shaft to actuate the answer-back arm in one direction or the other as may be necessary to cause it to follow up the switch-arm.

22. In a device for controlling an electric motor from a distant station, a switch-arm for starting said motor, an answer-back arm for following up the switch-arm, a driving-shaft rotated always in the same direction so long as the motor is running, two gears rotated in opposite directions by said shaft, and means for automatically connecting the proper gear with the answer-back arm when said switch-arm is moved away from said answer-back arm.

23. In a device for controlling an electric motor from a distant station, a switch-arm for starting said motor, an answer-back arm for following up the switch-arm, a driving-shaft, and an electromagnetic clutch in circuit with said switch-arm, and operating to connect the proper gear with the answer-back arm when said switch-arm is moved away from said answer-back arm.

24. In a device for controlling an electric motor at a distant station, a pole-changer for determining the direction of rotation of said motor, said pole-changer comprising two electromagnets, reversible gearing suitably driven, an electromagnetic clutch having two coils respectively connected in multiple with said electromagnets, a switch-arm adapted to energize said magnets and coils, and an answer-back arm connected by said clutch with the gearing.

25. A device for controlling an electric motor from a distant station, comprising a main-line switch for said motor, a reversing-switch, a pole-changer controlling said switches, a switch-arm, contact-segments, plugs on said arm connected with said pole-changer, adapted to close on said segments, an answer-back arm normally underlying said plugs, gearing for operating said answer-back arm, an electromagnetic clutch controlling said gearing and in circuit with said plugs, and a reciprocating alternating-current motor receiving current from said motor-armature and actuating said gearing.

In witness whereof I have hereunto set my hand this 5th day of June, 1905.

FREDERICK A. WILLARD.

Witnesses:
JOHN A. MCMANUS, Jr.,
HENRY O. WESTENDARP.